United States Patent
Britzke et al.

(10) Patent No.: US 7,131,383 B2
(45) Date of Patent: Nov. 7, 2006

(54) INNER WALL LINING OF THE BELLOWS OF A CONNECTION BETWEEN TWO HINGE-LINKED VEHICLES OR VEHICLE PARTS

(75) Inventors: Ingo Britzke, Kassel (DE); Andre Goebels, Kassel (DE); Sven Mohr, Kassel (DE)

(73) Assignee: Huebner GmbH, Kassel (DE)

(*) Notice: Subject to any disclaimer, the term of this patent is extended or adjusted under 35 U.S.C. 154(b) by 0 days.

(21) Appl. No.: 10/950,744

(22) Filed: Sep. 27, 2004

(65) Prior Publication Data

US 2005/0081742 A1    Apr. 21, 2005

(30) Foreign Application Priority Data

Oct. 16, 2003    (DE) ................ 103 48 049

(51) Int. Cl.
    *B60D 5/00*    (2006.01)
(52) U.S. Cl. ............... 105/17; 105/8.1; 105/15; 105/18
(58) Field of Classification Search ............ 105/8.1, 105/17, 21, 3, 10, 15, 18, 458, 16
    See application file for complete search history.

(56) References Cited

U.S. PATENT DOCUMENTS

| | | |
|---|---|---|
| 447,054 A | 2/1891 | Green |
| 2,073,198 A * | 3/1937 | Dodds, Jr. ............ 105/21 |
| 2,217,600 A | 10/1940 | Seel |
| 4,690,068 A * | 9/1987 | Delfourne ............ 105/8.1 |
| 6,009,813 A * | 1/2000 | Britzke ............ 105/8.1 |

FOREIGN PATENT DOCUMENTS

| | | |
|---|---|---|
| DE | 461 089 | 6/1961 |
| DE | 0 625 459 | 8/1995 |
| DE | 0 722 874 | 12/1998 |
| EP | 0 722 873 | 7/1996 |
| FR | 2 625 160 | 6/1989 |
| FR | 2625160 A2 * | 6/1989 |
| JP | 2002-347614 | 12/2002 |
| JP | 347614 A * | 12/2002 |

* cited by examiner

*Primary Examiner*—Frantz F. Jules
(74) *Attorney, Agent, or Firm*—Jordan and Hamburg LLP

(57) ABSTRACT

An inner wall lining of the bellows of a connection between two hinge-linked vehicles or vehicle parts is provided, the inner wall lining including several wall elements that are disposed within the connection so as to be slidabic relative to each other via a guide device, the guide device including at least one guide arn that is disposed on the one wall element and is oriented parallel to and at a distance of said wall element, the guide arm slidably receiving the other wall element, the distance between the one wall element and the guide arm corresponding approximately to the thickness of the other wall element.

6 Claims, 2 Drawing Sheets

US 7,131,383 B2

INNER WALL LINING OF THE BELLOWS OF A CONNECTION BETWEEN TWO HINGE-LINKED VEHICLES OR VEHICLE PARTS

FIELD OF THE INVENTION

The present invention relates to an inner wall lining of the bellows of a connection between two hinge-linked vehicles or vehicle parts, said inner wall lining comprising several wall elements that are disposed within the connection so as to be slidable relative to each other via a guide device.

DESCRIPTION OF THE PRIOR ART

EP 0 625 459 discloses an inner wall lining of a connection between two vehicles, more specifically of a connection having a pleated bellows configured like an inherently compliant plate that is domed about the normal axis in the direction of the center of the connection. This side wall covering is hereby compliantly connected to the respective one of the vehicles or vehicle parts. When the articulated train is traveling around a corner, such an inner wall lining bulges toward the interior side of the connection on the inner side of the curve while being stretched on the outer side of the curve which is more specifically due to the fact that, on the one side, the inner wall lining is slightly arched forward and that, on the other side, it is configured to be compliant in the region in which it is linked to the vehicle parts.

A very similar inner wall lining is also known from EP 0 722 874 by the way.

The disadvantage of the two afore mentioned implementations of an inner wall lining is that the material for the inner wall lining is quite expensive since the demands placed on the elastic deformation of the material are very high which results in a high price for such an inner wall lining. The known inner wall lining however definitely serves its purpose, protecting the bellows against vandalism on the one side and providing on the other side an improved visual appearance of the connection's interior as such.

There is further known an inner wall lining consisting of three individual wall elements with two of the wall elements being configured to be slidable relative to the third wall element. A pantograph arm allowing synchronous movement of the wall elements as these are caused to move when the vehicle is traveling around a curve is provided on the upper and the lower end of the wall elements for guiding the same. Moreover, the outer wall elements are disposed so as to be vertically movable in order to make certain that the wall lining is capable of yielding to for example the nodding movements of the vehicle parts or vehicles relative to each other and to the corresponding height offset of the vehicles relative to each other. In order to make such a vertical offset possible, a vertical rod for receiving the wall element is provided on each vehicle part or vehicle, with the wall element being carried on the rod so as to be resilient in the vertical direction. On the upper and lower end of the wall elements, there are further provided gap covers. It may be recognized that the wall covering described herein above is very complicated and, as a result thereof, very expensive, which is also due to the use of the two pantograph arms.

BRIEF SUMMARY OF THE INVENTION

It is therefore the object of the invention to provide an inner wall lining of the type mentioned herein above the guide elements of which are not visible on the one side and which, on the other side, requires a minimum number of parts so that the inner wall lining may be manufactured at low cost. It is another object of the invention to make certain that the wall elements, which are relatively movable, cannot be lifted the one from the other.

In accordance with the invention, the solution to this object is achieved in that the guide device includes at least one guide arm that is disposed on the one wall element and is oriented parallel to and at a distance of said wall element, the guide arm slidably receiving the other wall element, the distance between the one wall element and the guide arm corresponding approximately to the thickness of the other wall element. It will be obvious therefrom that the inner wall lining of the invention only needs two wall elements. The number of means required to guide the wall elements is accordingly small, which clearly reduces the price of such an inner wall lining. Moreover, the U-shaped arrangement of the guide arm on the one wall element for receiving the other wall element establishes such a rigid connection between the two wall elements that the one wall element cannot, or only with difficulty, be lifted from the other wall element, so that the risk of destruction thereof on the one side and the risk of fingers getting pinched on the other side are substantially avoided. Sealing lips may additionally be provided in the region of the connection, said sealing lips providing the connection with a more sophisticated visual appearance and contributing in preventing objects or fingers from penetrating therein between.

In accordance with a particular feature of the invention there is provided that a respective one of the wall elements is disposed on the respective one of the vehicles or vehicle parts in such a manner that it is pivotal on a hinge about a vertical axis so that it is capable of yielding to the movements occasioned when the vehicle or the vehicles parts are traveling around a curve. For mounting the inner wall lining and also in order to provide access to the bellows from the interior, there is provided that the hinge be releasably disposed on the vehicle or the vehicle part. For this purpose there may be provided a bolt that is insertable into a bushing, said bolt being fixated within the bushing with screws for example.

In accordance with another particular feature of the invention the guide arm exhibits a guide sleeve, said guide sleeve being disposed on the other wall element so as to be pivotal. In configuring the guide as a guide sleeve which is disposed on the guide arm so as to be longitudinally movable, one achieves a very stable connection which more specifically makes lifting one wall element from the other difficult or impossible. In pivotally disposing the guide sleeve on the other wall part, one achieves that, when the vehicle parts or the vehicles are vertically offset relative to one another as a result of the nodding movements of the vehicles or of the vehicle parts when the vehicles are driving over a hilltop or through a depression, vertical offset of the two wall elements is possible. In this context it should still be noted that the guide arm is also pivotally disposed on the one wall element.

The wall element in particular exhibits a bearing pillow on which the guide arm is pivotally disposed.

Between the guide sleeve and the guide arm there are moreover provided means for limiting the travel of the guide sleeve on the guide arm in order to prevent the two wall elements from being drawn apart and a vertical gap from forming as a result thereof.

The invention will be described in closer detail hereinafter with reference to the drawings.

DETAILED DESCRIPTION OF THE INVENTION

Figure 1:
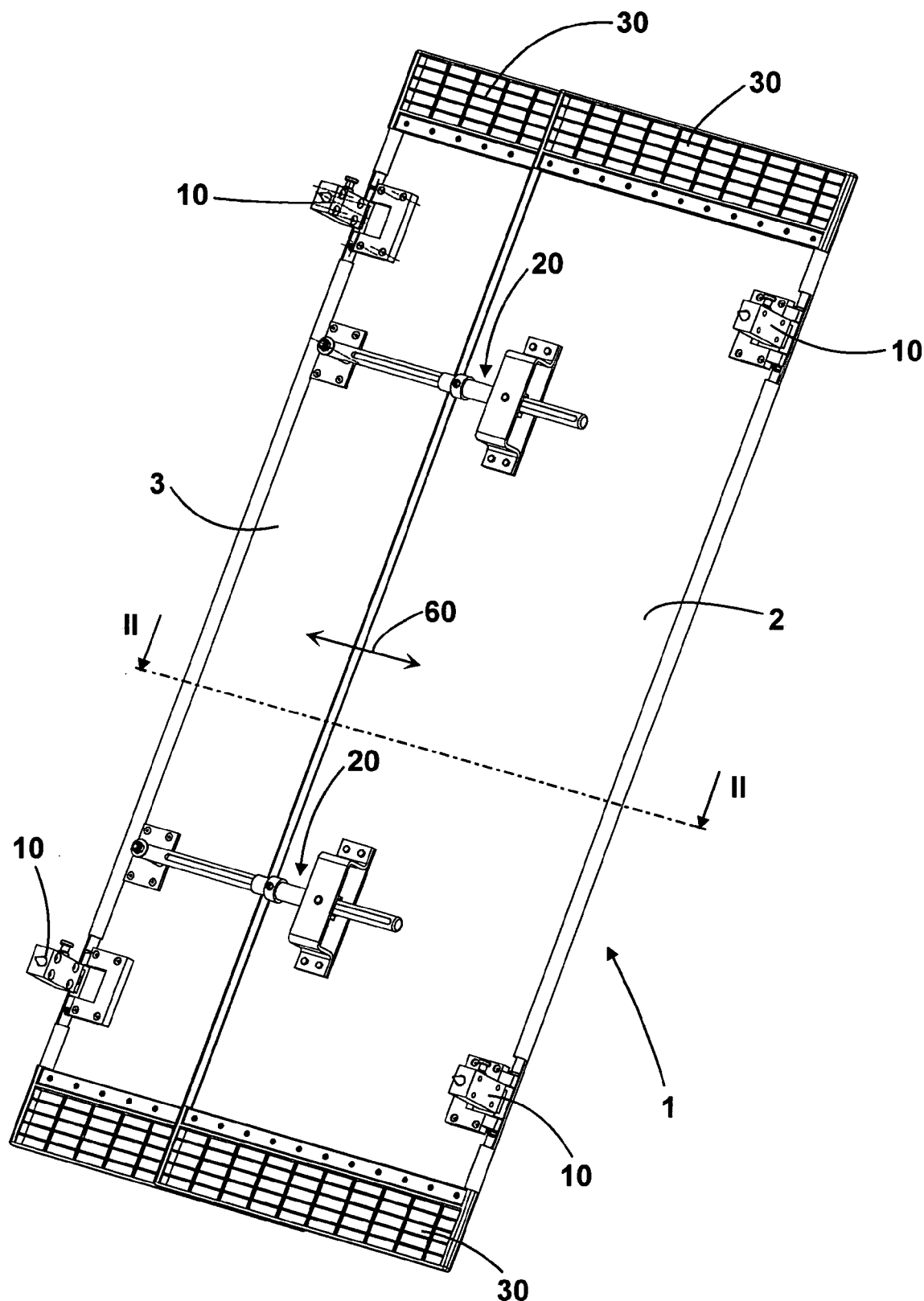
FIG. 1 is a perspective view illustrating the inner wall lining as such.

The inner wall lining 1 in accordance with FIG. 1 consists of the two wall elements 2 and 3. At their end sides, the wall elements 2 and 3 each have an upper and a lower hinge 10. Two guide devices 20 that are disposed one above the other are provided for interconnecting the two wall elements 2, 3. An elastic gap cover 30 is moreover disposed at the upper and at the lower end of every single wall element 2, 3.

Figure 2:
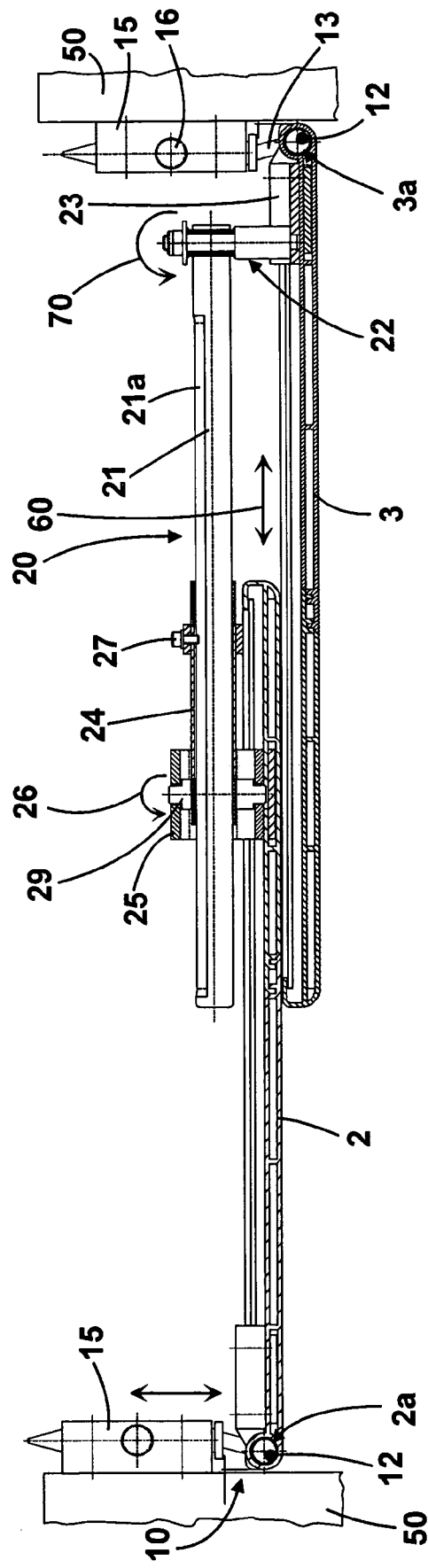
FIG. 2 is a sectional view of the inner wall lining according to FIG. 1 taken along the line II—II of FIG. 1.

The configuration of the guide device 20 is best shown in FIG. 2. From FIG. 2 it can be seen that the guide arm 21 is pivotally secured to the one wall element 3 through the bearing pillow generally indicated at 22. The bearing pillow 22 is carried on a mounting plate 23 that is connected with screws to the wall element 3. The guide arm 21, which is pivotally received by the bearing pillow 22, exhibits a guide sleeve 24, said guide sleeve 24 being received by a collar 25 that is secured like a bridge to the rear side of the other wall element 2, as is particularly apparent in FIG. 1. The important point is that the guide sleeve 24 is pivotally receivable by the collar 25 pursuant to arrow 26. The axis 29 serves to pivotally receive the guide sleeve 24 in the bridge-like collar 25 on the rear side of the other wall element pursuant to arrow 26.

The guide arm 21 further has a groove 21a in which there is guided a securing pin 27 that is disposed on the guide sleeve 24. The groove 21a extends over substantially the entire length of the guide arm 21 and serves, in conjunction with the securing pin 27, to prevent the wall elements from being drawn apart.

Each of the two wall elements 2, 3 is connected at its respective end side to the vehicle part 50 by means of hinges 10. The hinge 10 hereby includes the hinge eye 2a, 3a for receiving a bolt 12 to which the hinge arm 13 is linked, said hinge arm being releasably receivable by the bushing disposed on the vehicle part. A stud screw 16, which clampingly takes hold of the hinge arm 13 within the bushing, serves to fixate hinge arm 13 in bushing 15.

The functioning of the inner wall lining is such that, when the vehicle travels around a curve, the two wall elements 2, 3 are displaced relative to one another pursuant to arrow 60, as is evident from FIG. 2. When the two vehicle parts are vertically offset in relation to each other, accommodation between the two wall elements is achieved by the guide arm 21 pivoting about the bearing pillow 22 pursuant to arrow 70 while the guide sleeve 24 simultaneously pivots about the axis 29 pursuant to arrow 26. The gaps forming hereby at the lower and upper end respectively of the wall elements are covered by the elastic gap covering 30.

We claim:

1. An inner wall lining of a bellows of a connection between two hinge-linked vehicles, said inner wall lining comprising:

first and second wall elements disposed within the connection so as to be slidable relative to each other via a guide device;

said guide device including at least one guide arm disposed on one of said first and second wall elements and extending parallel to and distanced from said one of said first and second wall elements;

the distance between said one of said first and second wall elements and said one guide arm corresponding approximately to the thickness of another of said first and second wall elements; and said first and second wall elements each comprising a wall structure, one of said wall structures being disposed on the respective one of the vehicles so that said one of said wall structures is pivotal on a hinge about a vertical axis.

2. The inner wall lining of claim 1, wherein the hinge is releasably disposed on the vehicle.

3. An inner wall lining of a bellows of a connection between two hinge-linked vehicles, said inner wall lining comprising:

wall elements disposed within the connection so as to be slidable relative to each other via a guide device;

said guide device including at least one guide arm disposed on one of the wall elements and being oriented parallel to and at a distance from said one wall element;

the distance between said one wall element and said one guide arm corresponding approximately to the thickness of another of said wall elements; and said one guide arm comprising a guide sleeve, said guide sleeve being pivotally disposed on said other wall element.

4. The inner wall lining of claim 3, wherein said one guide arm is pivotally disposed on said one of said first and second wall elements.

5. The inner wall lining of claim 4, wherein said one wall element comprises a bearing pillow on which said one guide arm is pivotally disposed.

6. The inner wall lining of claim 3, further comprising means for limiting the travel of said guide sleeve on said one guide arm, said means being disposed between said guide sleeve and said one guide arm.

* * * * *